US010785120B2

(12) United States Patent
Ballard et al.

(10) Patent No.: US 10,785,120 B2
(45) Date of Patent: Sep. 22, 2020

(54) SYSTEMS AND METHODS FOR EXTENDING LINK LAYER DISCOVERY OVER VIRTUAL ETHERNET BRIDGES

(71) Applicant: Dell Products L.P., Round Rock, TX (US)

(72) Inventors: Lee E. Ballard, Georgetown, TX (US); Robert T. Stevens, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 16/020,070

(22) Filed: Jun. 27, 2018

(65) Prior Publication Data
US 2020/0007400 A1    Jan. 2, 2020

(51) Int. Cl.
| H04L 12/24 | (2006.01) |
| H04L 12/861 | (2013.01) |
| H04L 29/12 | (2006.01) |
| H04L 12/46 | (2006.01) |
| H04L 12/931 | (2013.01) |
| G06F 9/455 | (2018.01) |
| H04L 29/08 | (2006.01) |

(52) U.S. Cl.
CPC .......... *H04L 41/12* (2013.01); *G06F 9/45558* (2013.01); *H04L 12/4675* (2013.01); *H04L 49/351* (2013.01); *H04L 49/9068* (2013.01); *H04L 61/1541* (2013.01); *H04L 69/324* (2013.01); *G06F 2009/45595* (2013.01)

(58) Field of Classification Search
CPC ...................................... H04L 45/02
See application file for complete search history.

(56) References Cited

U.S. PATENT DOCUMENTS

| 2010/0290467 A1* | 11/2010 | Eisenhauer ............. H04L 41/00 370/392 |
| 2013/0176900 A1* | 7/2013 | Jogadhenu .......... H04L 12/2809 370/255 |
| 2015/0188827 A1* | 7/2015 | Li ........................ H04L 41/085 370/254 |

* cited by examiner

*Primary Examiner* — Natasha W Cosme
(74) *Attorney, Agent, or Firm* — Jackson Walker L.L.P.

(57) ABSTRACT

In accordance with embodiments of the present disclosure, an information handling system may include a host system comprising a host system processor and a network interface coupled to the host system processor and may include a management controller communicatively coupled to the host system processor and configured to provide management of the information handling system. The network interface may be configured to capture discovery protocol packets and encode the discovery protocol packets with extended discovery protocol information comprising information regarding physical functions, virtual functions, and ports associated with the discovery protocol packets.

16 Claims, 5 Drawing Sheets

SYSTEMS AND METHODS FOR EXTENDING LINK LAYER DISCOVERY OVER VIRTUAL ETHERNET BRIDGES

TECHNICAL FIELD

The present disclosure relates in general to information handling systems, and more particularly to methods and systems for extending link layer discovery over virtual Ethernet bridges.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Virtualization, wherein actual physical components are emulated to a computing device, is often used in information handling systems. For example, single root input/output virtualization (SR-IOV) is a technique that allows the isolation of PCI Express (PCIe) resources for manageability and performance reasons. Using SR-IOV, a single physical PCIe device may be shared on a virtualized computing environment. SR-IOV offers different virtual functions to different virtual components (e.g., a network adapter) on a physical server machine. Thus, SR-IOV allows different virtual machines in a virtualized computing environment to share a single PCIe hardware interface.

Virtual Ethernet Bridge (VEB) is defined in Institute of Electrical and Electronics Engineers (IEEE) standard 802.1Qbg-2012 and incorporated into IEEE standard 802.1Q-2014. A VEB must filter reserved Media Access Control (MAC) addresses used for Link Layer Discover Protocol (LLDP). An SR-IOV network interface card may include an embedded switch (eSwitch) that acts as an Edge Relay (ER) that may act as VEB. Accordingly, when SR-IOV is used for virtualization, the network edge exists at a Virtual Ethernet Bridge (VEB) inside a network interface (e.g., a network interface card) of an information handling system. A VEB is intended to act like a dumb switch. For example, a VEB does not implement Link Layer Discover Protocol (LLDP) and Simple Network Management Protocol (SNMP) like a typical managed switch, and thus a management console that attempts to discover a network topology may not be able to see beyond the VEB. In addition, a host operating system/hypervisor attached to physical functions (PFs) and guest operating system/virtual machines attached to virtual functions (VFs) normally cannot transmit LLDP messages through a VEB and a VEB does not collect this information. However, knowledge by a management console regarding where a virtual machine exists within a network topology may be useful to limit outages and balance port usage.

SUMMARY

In accordance with the teachings of the present disclosure, the disadvantages and problems associated with existing approaches for link layer discovery may be reduced or eliminated.

In accordance with embodiments of the present disclosure, an information handling system may include a host system comprising a host system processor and a network interface coupled to the host system processor and may include a management controller communicatively coupled to the host system processor and configured to provide management of the information handling system. The network interface may be configured to capture discovery protocol packets and encode the discovery protocol packets with extended discovery protocol information comprising information regarding physical functions, virtual functions, and ports associated with the discovery protocol packets.

In accordance with these and other embodiments of the present disclosure, a method may include, in an information handling system comprising a host system including a host system processor and a network interface coupled to the host system processor and comprising a management controller communicatively coupled to the host system processor and configured to provide management of the information handling system: capturing, by the network interface, discovery protocol packets, and encoding, by the network interface, the discovery protocol packets with extended discovery protocol information comprising information regarding physical functions, virtual functions, and ports associated with the discovery protocol packets.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system including a host system processor and a network interface coupled to the host system processor and comprising a management controller communicatively coupled to the host system processor and configured to provide management of the information handling system: capture, by the network interface, discovery protocol packets, and encode, by the network interface, the discovery protocol packets with extended discovery protocol information comprising information regarding physical functions, virtual functions, and ports associated with the discovery protocol packets.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
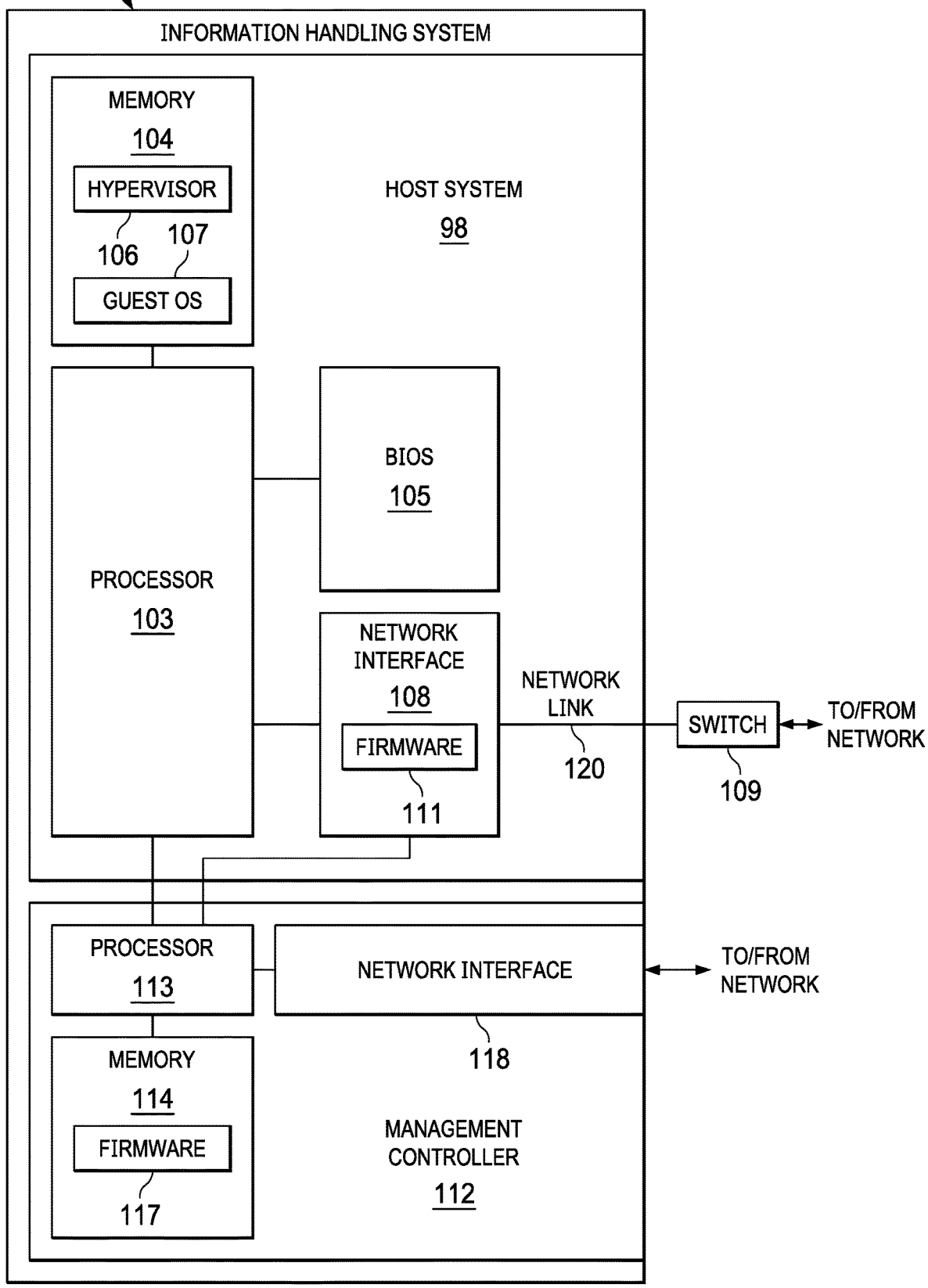
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103. As also shown in FIG. 1, a switch 109 may ommunicatively coupled to network interface 108 via a network link 120. In operation, processor 103, memory 104, BIOS 105, and network interface 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, a memory 104 may have stored thereon a hypervisor 106 and one or more guest operating systems (OS) 107. In some embodiments, hypervisor 106 and one or more of guest OSes 107 may be stored in a computer-readable medium (e.g., a local or remote hard disk drive) other than a memory 104 which is accessible to processor 102.

A hypervisor 106 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. A hypervisor 106 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In some embodiments, a hypervisor 106 may comprise a specially-designed OS with native virtualization capabilities. In another embodiment, a hypervisor 106 may comprise a standard OS with an incorporated virtualization component for performing virtualization.

In other embodiments, a hypervisor 106 may comprise a standard OS running alongside a separate virtualization application. In such embodiments, the virtualization application of the hypervisor 106 may be an application running above the OS and interacting with computing system resources only through the OS. Alternatively, the virtualization application of a hypervisor 106 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 106 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 106 may instantiate one or more virtual machines. A virtual machine may comprise any program of executable instructions, or aggregation of programs of executable instructions, configured to execute a guest OS 107 in order to act through or in connection with a hypervisor 106 to manage and/or control the allocation and usage of hardware resources such as memory, CPU time, disk space, and input and output devices, and provide an interface between such hardware resources and application programs hosted by the guest OS 107. In some embodiments, a guest OS 107 may be a general-purpose OS such as WINDOWS or LINUX, for example. In other embodiments, a guest OS 107 may comprise a specific- and/or limited-purpose OS, configured so as to perform application-specific functionality (e.g., persistent storage).

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via a network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

As shown in FIG. 1, network interface 108 may have stored thereon firmware 111. Firmware 111 may comprise any program of executable instructions, or collection of such programs, configured to, when executed, carry out the functionality of network interface 108 as described in more detail herein.

Switch 109 may be communicatively coupled between network interface 108 and a network external to information handling system 102, and may comprise any system, device, or apparatus configured to route communications between network interface 108 and the external network. In some embodiments, switch 109 may comprise a "top of rack" switch or similar device. Such management network may couple to a management console and/or other device whereby an administrator may manage information handling system 102 via network interface 108 and/or management controller 112.

Management controller 112 may be configured to provide management facilities for management of information handling system 102. Such management may be made by management controller 112 even if information handling system 102 is powered off or powered to a standby state. Management controller 112 may include a processor 113, memory 114, and a network interface 118 separate from and physically isolated from network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, network interface 108 may have stored thereon firmware 117. Firmware 117 may comprise any program of executable instructions, or collection of such programs, configured to, when executed, carry out the functionality of management controller 112 as described in more detail herein.

Network interface 118 may comprise any suitable system, apparatus, or device operable to serve as an interface between management controller 112 and one or more other information handling systems via a network. Network interface 118 may enable management controller 112 to communicate using any suitable transmission protocol and/or standard. In these and other embodiments, network interface 118 may comprise a network interface card, or "NIC."

In addition to processor 103, memory 104, network interface 108, and management controller 112, information handling system 102 may include one or more other information handling resources.

Figure 2:
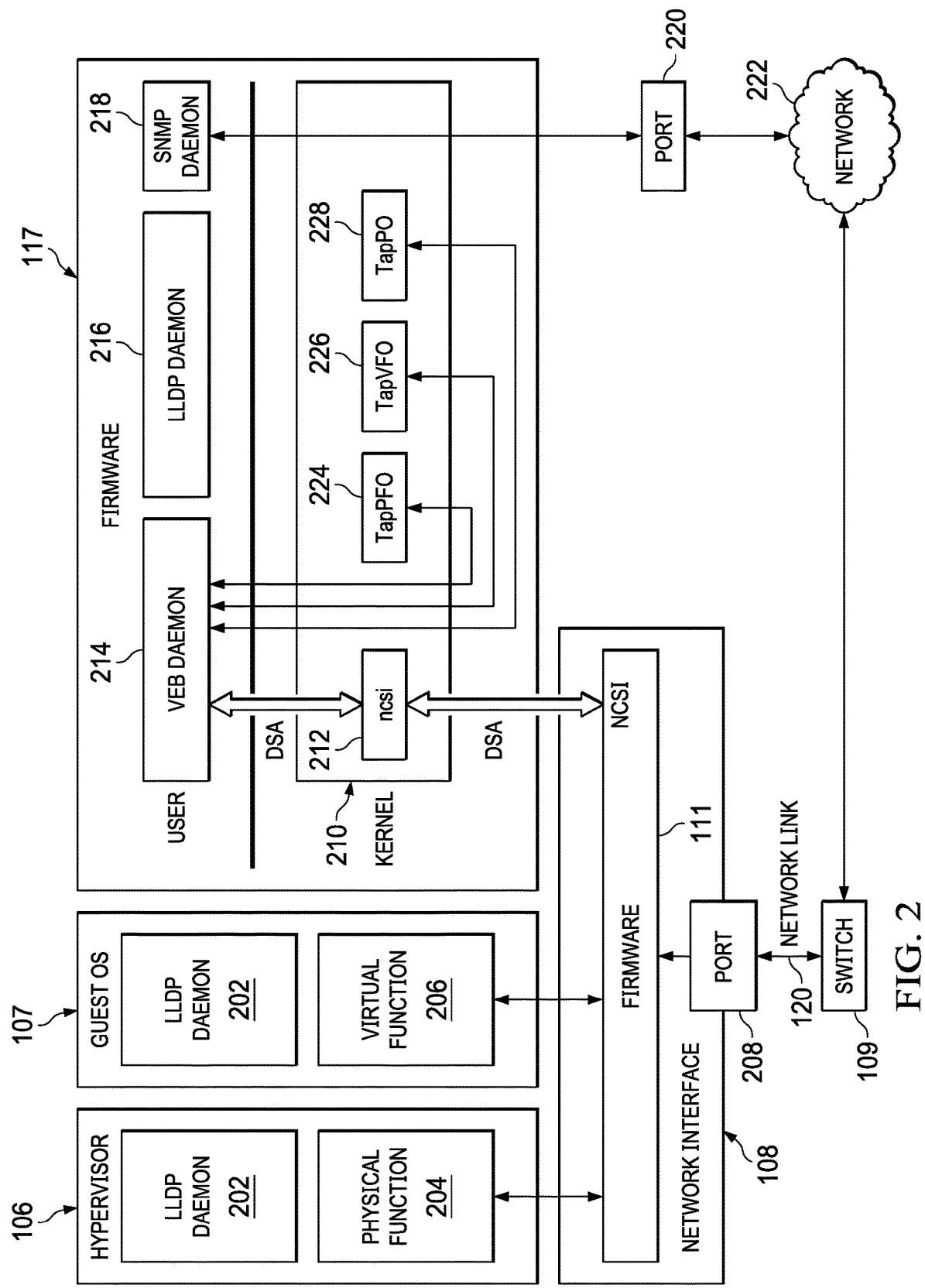
FIG. 2 illustrates an architectural functional block diagram of selected components of the information handling system of FIG. 1, in accordance with embodiments of the present disclosure.

FIG. 2 illustrates an architectural functional block diagram of selected components of information handling system 102, in accordance with embodiments of the present disclosure. As shown in FIG. 2, each of hypervisor 106 and a guest OS 107 may execute a Link Layer Discovery Protocol (LLDP) daemon 202. An LLDP daemon 202 may comprise any background process that may execute in connection with hypervisor 106 or guest OS 107 to perform tasks related to carrying out LLDP operations on hypervisor 106 or guest OS 107.

Also as shown in FIG. 2, hypervisor 106 may be attached to a physical function 204 and guest OS 107 may be attached to a virtual function 206. A device (e.g., network interface 108) which has been virtualized may be accessed by two or more virtual functions 206, which allows the sharing of the resource. A physical function 204 representing an information handling resource may be provided to a single operating system (e.g., hypervisor 106). Multiple instances of a virtual function 206 may be provided to multiple operating systems (e.g., guest OSes 107). If, for example, multiple operating systems are sharing a device, then access to such device may be divided into multiple virtual functions (e.g., divided into multiple network interfaces using virtual functions), each of which may be mapped to their respective guest OS 107.

Physical function 204 and virtual function 206 may interact with firmware 111 of network interface 108 as shown in FIG. 2 and as also described in greater detail below.

Network interface 108 may couple to switch 109 via a port 208 of network interface 108, and switch 109 may in turn couple to network 222.

As shown in FIG. 2, firmware 117 of management controller 112 may execute a kernel 210, a virtual Ethernet bridge daemon 214, an LLDP daemon 216, and a Simple Network Management Protocol (SNMP) daemon 218. Kernel 210 may include a Network Controller Sideband Interface (NC-SI) driver 212 and a plurality of tap interfaces including at least a tap interface 224 (TapPF0) for physical function 204, a tap interface 226 (TapVF0) for a virtual function 206, and a tap interface 228 (TapP0) for port 208. As known in the art, a tap interface is a feature present in by an operating system (e.g., Linux and/or other UNIX-like operating systems) that may perform user space networking, which may allow user space programs to see raw network traffic (at the Ethernet or Internet Protocol level) and act on such traffic. A virtual private network (VPN) is an example of a tap interface.

VEB daemon 214 may comprise any background process that may execute to perform tasks related to carrying out VEB operations on management controller 112, as described in greater detail herein. LLDP daemon 216 may comprise any background process that may execute to perform tasks related to carrying out LLDP operations on management controller 112. SNMP daemon 218 may comprise any background process that may execute to perform tasks related to carrying out SNMP operations on management controller 112.

As shown in FIG. 2, SNMP daemon 218 may communicate to network 222 via port 220.

In operation, firmware 111 of network interface 108 may be configured to encapsulate all LLDP packets sent from guest OS virtual functions 206, hypervisor physical functions 204, and switch 109, and directs all LLDP packets to VEB daemon 214 via NC-SI. Such encapsulation may include extended LLDP information on how the packet came into network interface 108 (e.g., physical function, virtual function, or port via which the packet entered network interface 108). Firmware 111 and VEB daemon 214 may use any appropriate encoding or encapsulation to communicate, including without limitation Distributed Switch Architecture (DSA) as shown in FIG. 2, or other encoding such as virtual local area network (VLAN) encoding or Ethernet encoding. VEB daemon 214 may unpack the encapsulated packets and route the packets to tap interfaces 224, 226, and 228, as appropriate, based on the extended LLDP information present in the packet encapsulation.

Using the tap interfaces 224, 226, 228, LLDP daemon 216 and SNMP daemon 218 may be used to provide neighbor information to network 222. For example, LLDP daemon 216 may process the LLDP packets it receives on the tap interfaces 224, 226, and 228 and LLDP daemon may also send LLDP information including the management controller unique address (e.g., Internet Protocol address) and tap interface identifier on each tap interface 224, 226, and 228.

VEB daemon 214 may also read packets received on all the tap interfaces 224, 226, and 228 and may encapsulate the packets with extended LLDP information to direct them to the correct physical function, virtual functions, or external port based on the tap. Firwmare 111 (which may comprise specially modified or adapted firmware) may decode the encapsulated packets received from VEB daemon 214 and forward such LLDP packets based on the extended LLDP information of the encapsulation. In this way, LLDP daemon 216 of management controller 112 may communicate unique LLDP information to each physical function, virtual function, and external port (e.g., port 208). One use of such unique LLDP information is to inform a virtual machine of a guest OS 107 which virtual function it is associated with so that it can obtain device physical port information.

To further illustrate the advantages of the systems and methods described herein, LLDP may comprise one-directional communication and the packets sent to each virtual function, physical function, and port may need to be different. However, even though the contents of the LLDP packets are different the destination MAC address may always be the same. Firmware 111 may be advantageously useful as it may allow management controller 112 to send packets that all have the same destination MAC address over a common link between management controller 112 and network interface 108 and have network interface 108 forward the packet to a specific port based not on destination MAC but based on the port assignment in the encapsulation. In other words, if firmware 111 did not encode LLDP packets it receives with port information before sending it to management controller 112, management controller 112 would not be able to distinguish which virtual function, physical function, or port the LLDP packet arrived on.

Figure 3:
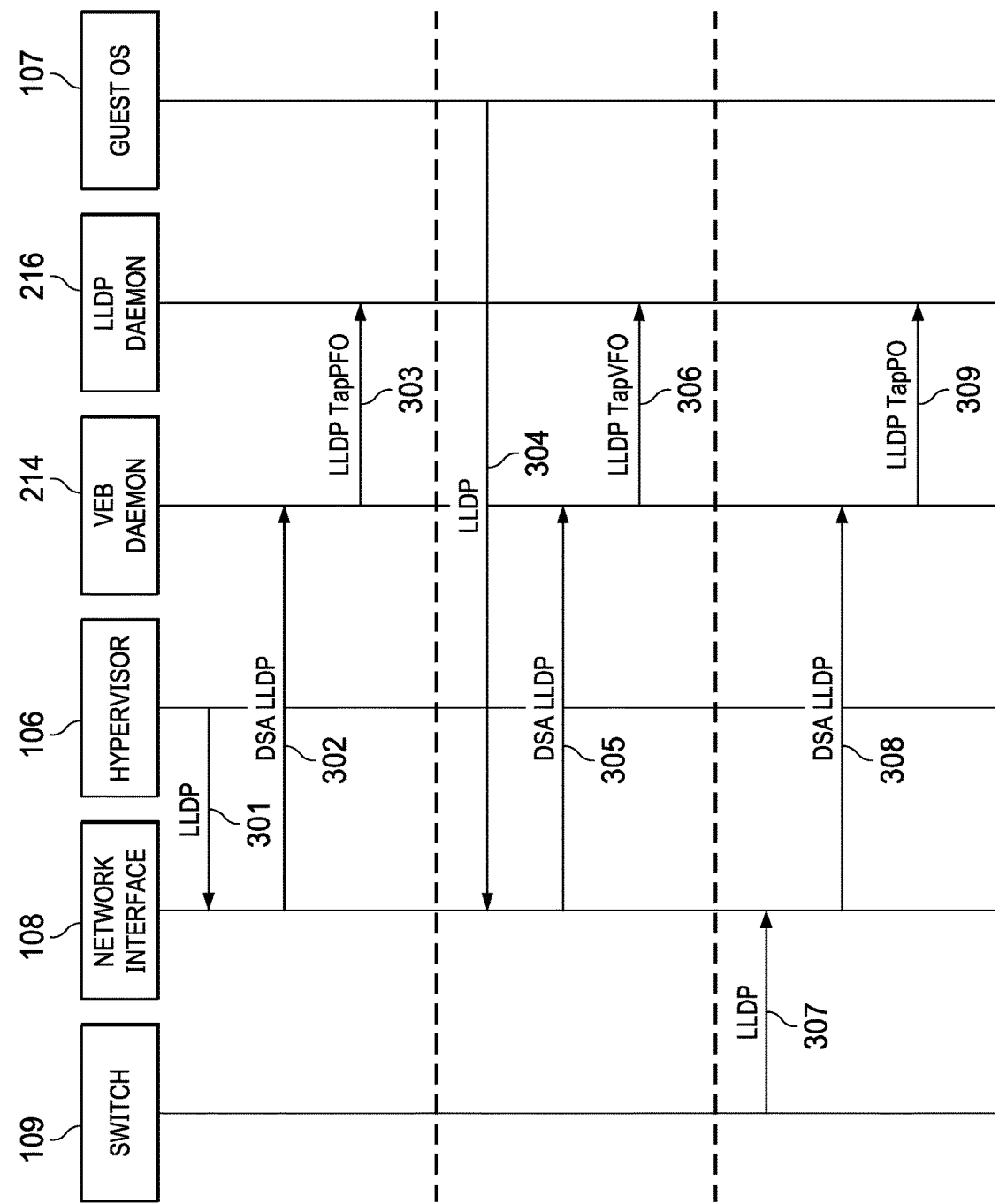
FIG. 3 illustrates a flow diagram of processing for incoming Link Layer Discovery Protocol traffic, in accordance with embodiments of the present disclosure.

FIG. 3 illustrates a flow diagram of processing for incoming LLDP traffic, in accordance with embodiments of the present disclosure. In particular, FIG. 3 illustrates LLDP traffic entering network interface 108 via hypervisor 106 (e.g., at operation 301), guest OS 107 (e.g., at operation 304) and switch 109 (e.g., at operation 307), respectively. All incoming LLDP may be captured but not forwarded by network interface 108. Instead, firmware 111 may encapsulate/encode the captured LLDP packets with extended LLDP information (e.g., with DSA tags) and send such encapsulated LLDP packets to VEB daemon 214 (e.g., operations 302, 305, and 308). VEB daemon 214 may decode the encapsulated LLDP packets and send the decoded packets to an appropriate tap interface 224, 226, and 228 based on the extended LLDP information (e.g., present in the DSA tags) (e.g., operations 303, 306, and 309). LLDP daemon 216 may receive each LLDP packet from tap interfaces 224, 226, and 228 and populates a neighbor information table based on the respective tap interface 224, 226, or 228 associated with the LLDP packet.

Figure 4:
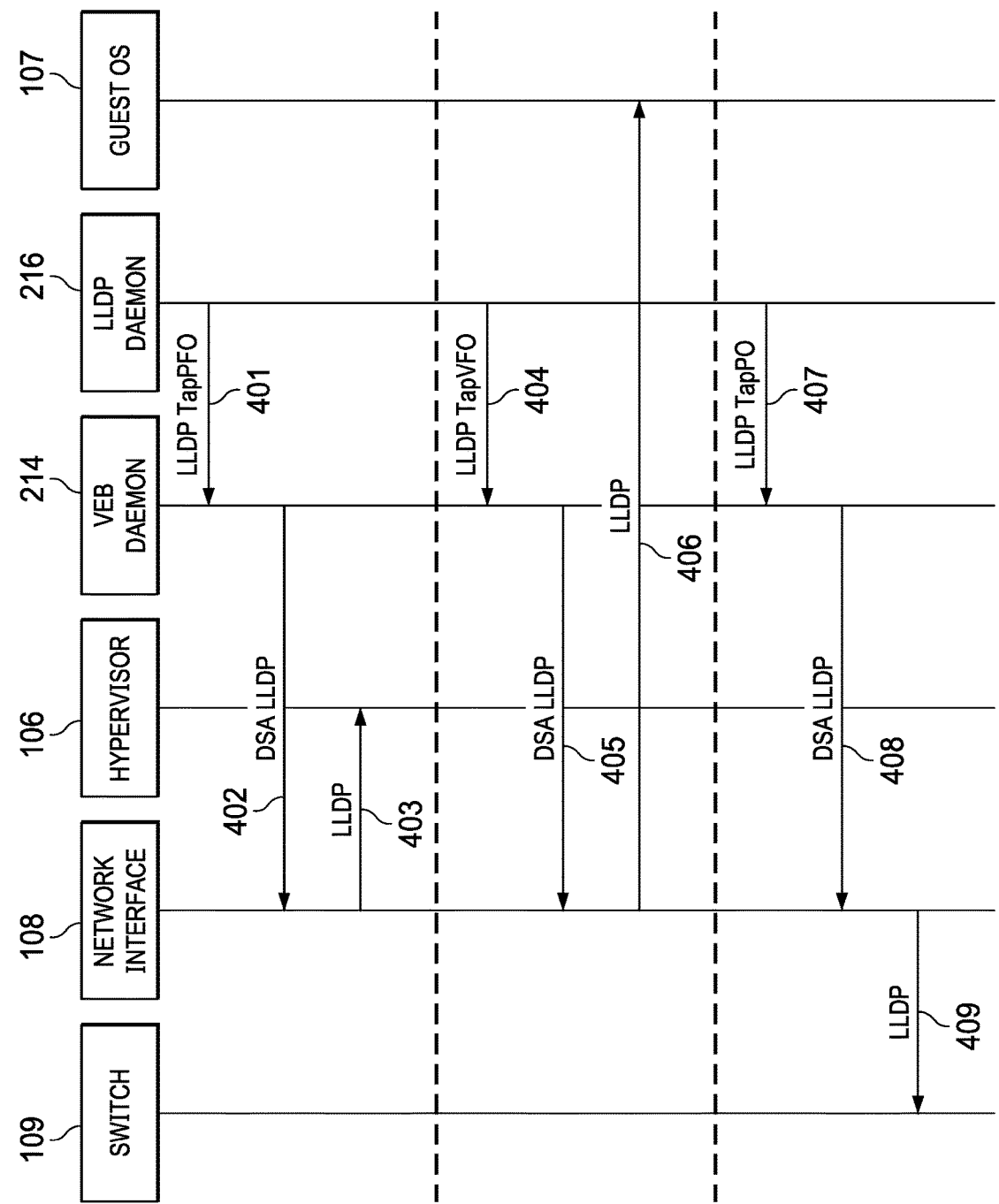
FIG. 4 illustrates a flow diagram of processing for outgoing Link Layer Discovery Protocol traffic, in accordance with embodiments of the present disclosure.

FIG. 4 illustrates a flow diagram of processing for outgoing LLDP traffic, in accordance with embodiments of the present disclosure. In other words, FIG. 4 illustrates processing of LLDP packets generated at management controller 112 for physical functions, virtual functions, and switch 109. In operation, LLDP daemon 216 may send different LLDP packets on each tap interface 224, 226, and 228 (e.g., operations 401, 404, and 407). The packets may be sent to different tap interfaces 224, 226, and 228 because an identifier of the tap interface to which the LLDP packets are being sent may be included within the LDDP packets themselves. VEB daemon 214 may receive the LLDP packets from the various tap interfaces 224, 226, and 228 and encode the LLDP packets based on the tap interface on which each LLDP packet was received by VEB daemon 214 (e.g., operations 402, 405, and 408). Accordingly, there may be a one-to-one mapping of tap interfaces 224, 226, and 228 to physical functions, virtual functions, and ports. Firmware 111 of network interface 108 may decode the encapsulated LLDP packets and communicate each packet to the appropriate physical function, virtual function, or port based on the extended LLDP information (e.g., operations 403, 406, and 409).

Figure 5:
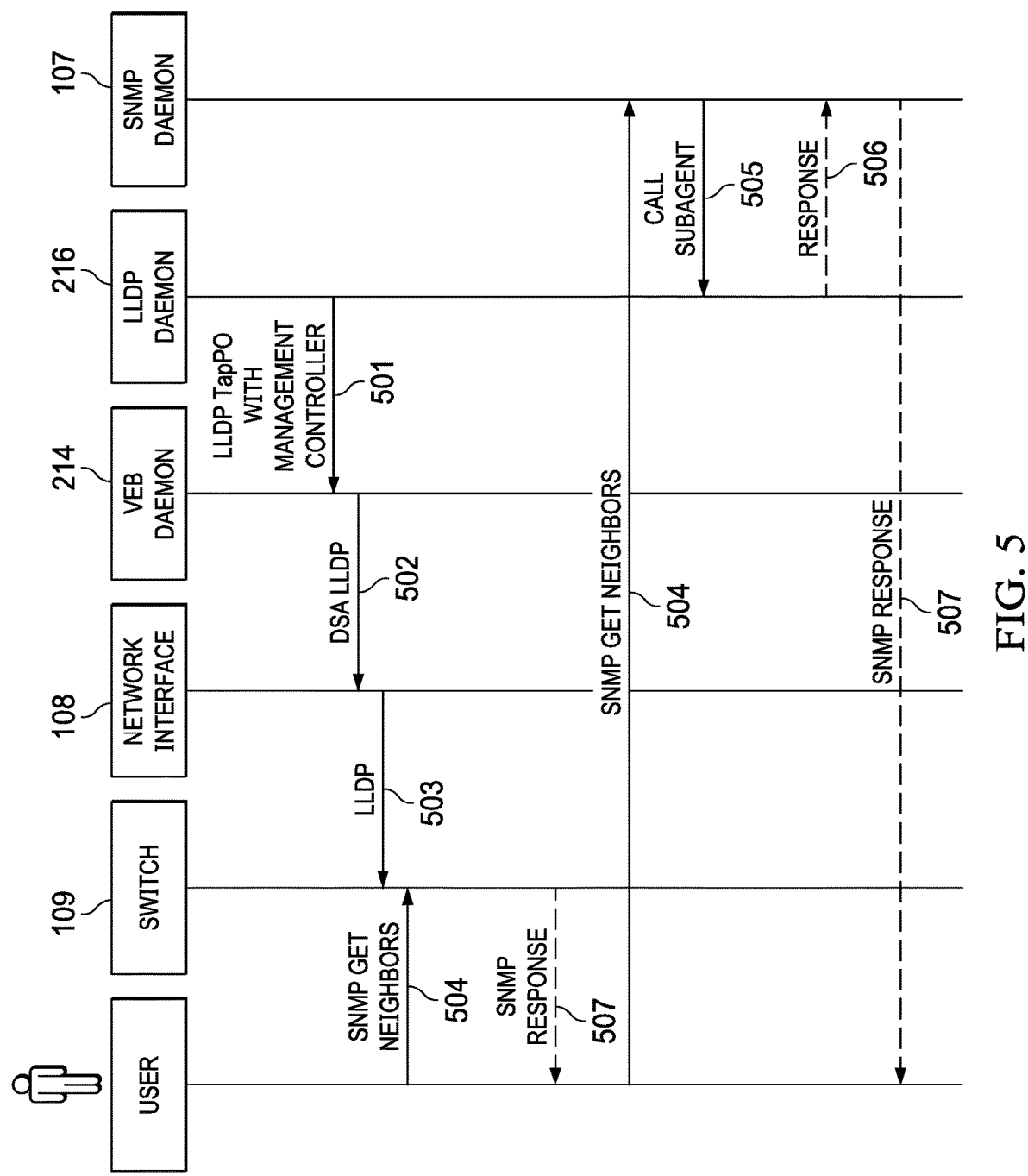
FIG. 5 illustrates a flow diagram of a process for gathering information regarding virtual machines coupled to single root input/output virtualization connections, in accordance with embodiments of the present disclosure.

FIG. 5 illustrates a flow diagram of a process for gathering information regarding virtual machines coupled to single root input/output virtualization connections, in accordance with embodiments of the present disclosure. One of the type-length-value encodings sent by management controller 112 in an outgoing LLDP packet received by switch 109 may be the unique address (e.g., Internet Protocol address) of management controller 112. When a user performs network discovery, the standard procedure is to start at a known location in a network and retrieve management unique identifiers for addresses of all the neighbors and recursively query neighbors, neighbor's neighbors, and so on to complete network discovery. Accordingly, operations such as operations 501-507 shown in FIG. 5 may be performed to gather information regarding virtual machines coupled to single root input/output virtualization connections using existing approaches to network discovery.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
 a host system comprising:
  a host system processor; and
  a network interface coupled to the host system processor; and
 a management controller communicatively coupled to the host system processor and configured to provide management of the information handling system;
 wherein the network interface is configured to:
  capture discovery protocol packets having destinations associated therewith;
  delay forwarding of the captured discovery protocol packets to the respective destinations;
  encode the discovery protocol packets with extended discovery protocol information comprising information regarding physical functions, virtual functions, and ports associated with the discovery protocol packets; and
  subsequent to the encoding, forward the encoded discovery protocol packets to the respective destinations.

2. The information handling system of claim 1, wherein the management controller is configured to:
 receive discovery protocol packets with encoded extended discovery protocol information; and
 direct the discovery protocol packets to physical functions, virtual functions, and ports associated with the discovery protocol packets based on the encoded extended discovery protocol information.

3. The information handling system of claim 1, wherein a discovery protocol daemon executing on the management controller is configured to translate discovery protocol packet type-length-value information from an external port of the management controller to identifiers of virtual functions and physical functions of the host system.

4. The information handling system of claim 1, wherein the management controller is further configured to, based on the extended discovery protocol information, discover virtual machines executing on the host system and associated with virtual functions of the network interface, wherein the network interface is single-root input/output virtualization enabled.

5. The information handling system of claim 1, wherein the discovery protocol comprises Link Layer Discovery Protocol.

6. The information handling system of claim 1, wherein the discovery protocol packets are encoded in accordance with one of Distributed Switch Architecture encoding, virtual local area network encoding, and Ethernet encoding.

7. A method comprising, in an information handling system comprising a host system including a host system processor and a network interface coupled to the host system processor and comprising a management controller communicatively coupled to the host system processor and configured to provide management of the information handling system:
capturing, by the network interface, discovery protocol packets having destinations associated therewith;
delaying forwarding of the captured discovery protocol packets to the respective destinations;
encoding, by the network interface, the discovery protocol packets with extended discovery protocol information comprising information regarding physical functions, virtual functions, and ports associated with the discovery protocol packets; and
subsequent to the encoding, forwarding the encoded discovery protocol packets to the respective destinations.

8. The method of claim 7, further comprising:
receiving, by the management controller, discovery protocol packets with encoded extended discovery protocol information; and
directing, by the management controller, the discovery protocol packets to physical functions, virtual functions, and ports associated with the discovery protocol packets based on the encoded extended discovery protocol information.

9. The method of claim 7, further comprising translating, by a discovery protocol daemon executing on the management controller, discovery protocol packet type-length-value information from an external port of the management controller to identifiers of virtual functions and physical functions of the host system.

10. The method of claim 7, further comprising, based on the extended discovery protocol information, discovering virtual machines executing on the host system and associated with virtual functions of the network interface, wherein the network interface is single-root input/output virtualization enabled.

11. The method of claim 7, wherein the discovery protocol comprises Link Layer Discovery Protocol.

12. The method of claim 7, wherein the discovery protocol packets are encoded in accordance with one of Distributed Switch Architecture encoding, virtual local area network encoding, and Ethernet encoding.

13. An article of manufacture comprising:
a non-transitory computer-readable medium; and
computer-executable instructions carried on the computer-readable medium, the instructions readable by a processor, the instructions, when read and executed, for causing the processor to, in an information handling system comprising a host system including a host system processor and a network interface coupled to the host system processor and comprising a management controller communicatively coupled to the host system processor and configured to provide management of the information handling system:
capture, by the network interface, discovery protocol packets having destinations associated therewith;
delay forwarding of the captured discovery protocol packets to the respective destinations;
encode, by the network interface, the discovery protocol packets with extended discovery protocol information comprising information regarding physical functions, virtual functions, and ports associated with the discovery protocol packets; and
subsequent to the encoding, forward the encoded discovery protocol packets to the respective destinations.

14. The article of claim 13, wherein the instructions further cause the processor to, based on the extended discovery protocol information, discover virtual machines executing on the host system and associated with virtual functions of the network interface, wherein the network interface is single-root input/output virtualization enabled.

15. The article of claim 13, wherein the discovery protocol comprises Link Layer Discovery Protocol.

16. The article of claim 13, wherein the discovery protocol packets are encoded in accordance with one of Distributed Switch Architecture encoding, virtual local area network encoding, and Ethernet encoding.

* * * * *